US010336086B2

(12) United States Patent
Matsuda

(10) Patent No.: US 10,336,086 B2
(45) Date of Patent: Jul. 2, 2019

(54) SERVER DEVICE FOR ORDERING CARTRIDGE AND PROGRAM THEREOF

(71) Applicant: Brother Kogyo Kabushiki Kaisha, Nagoya-shi, Aichi-ken (JP)

(72) Inventor: Makoto Matsuda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 15 days.

(21) Appl. No.: 15/085,158

(22) Filed: Mar. 30, 2016

(65) Prior Publication Data

US 2016/0288515 A1 Oct. 6, 2016

(30) Foreign Application Priority Data

Mar. 31, 2015 (JP) .................................. 2015-073937

(51) Int. Cl.
*B41J 2/175* (2006.01)
*G06K 15/00* (2006.01)
*G06F 3/12* (2006.01)

(52) U.S. Cl.
CPC .......... *B41J 2/17543* (2013.01); *G06F 3/121* (2013.01); *G06F 3/1235* (2013.01); *G06F 3/1287* (2013.01); *G06K 15/4075* (2013.01)

(58) Field of Classification Search
CPC . B41J 2/17543; G06K 15/4075; G06Q 10/00; G06Q 10/087; G06Q 50/00; H04L 67/125; H04L 2463/081
See application file for complete search history.

(56) References Cited

U.S. PATENT DOCUMENTS

| 7,426,482 B2* | 9/2008 | Inami .................. G06Q 10/087 705/26.82 |
| 9,292,802 B2* | 3/2016 | Arakawa ............... G06Q 10/00 |
| 9,710,782 B2* | 7/2017 | Matsuda .............. G06Q 10/087 |
| 2002/0077979 A1 | 6/2002 | Nagata |
| 2003/0040984 A1 | 2/2003 | Inami et al. |
| 2008/0243649 A1 | 10/2008 | Arakawa |

(Continued)

FOREIGN PATENT DOCUMENTS

| JP | 2002-099594 A | 4/2002 |
| JP | 2003-063104 A | 3/2003 |
| JP | 2008-243057 A | 10/2008 |

*Primary Examiner* — Umut Onat

(74) *Attorney, Agent, or Firm* — Banner & Witcoff, Ltd.

(57) ABSTRACT

A server device comprising: a communication unit, a storage unit storing device identification information for identifying an image forming apparatus communicable with the server device via the communication unit. Recording material is contained in a cartridge attachable to and detachable from the image forming apparatus. The control unit is configured to perform: (a) receiving residual amount information about residual amount of the recording material; (b) determining whether or not the residual amount of the recording material is equal to or less than a first threshold; (c) determining whether or not the residual amount information is about the cartridge that has been delivered in accordance with an order instruction; and in response to affirmative determination made in (b) and affirmative determination made in (c), transmitting the order instruction to the external device via the communication unit.

11 Claims, 11 Drawing Sheets

(56) References Cited

U.S. PATENT DOCUMENTS

| | | | | |
|---|---|---|---|---|
| 2010/0049636 A1* | 2/2010 | Sawada | ............... | G06Q 10/087 |
| | | | | 705/28 |
| 2010/0191620 A1* | 7/2010 | Sunata | ............... | G03G 15/5079 |
| | | | | 705/28 |
| 2014/0023382 A1* | 1/2014 | Kawana | ............... | G03G 15/556 |
| | | | | 399/8 |

* cited by examiner

FIG. 2

| PRINTER ID | SPECIFIC INFORMATION OF CONNECTED CARTRIDGE | SPECIFIC INFORMATION OF ORDERED CARTRIDGE |
|---|---|---|
| printer_1234 | (M116~M132) (M134~)<br>SPECIFIC → SPECIFIC<br>INFO #1      INFO #A | (M111~M146) (M146~)<br>SPECIFIC → SPECIFIC<br>INFO #A      INFO #B |
| ⋮ | ⋮ | ⋮ |

| PRINTER ID | USER ID |
|---|---|
| printer_1234 | NAME: ICHIRO SUZUKI, ADDRESS: Aichi-ken, Nagoya-shi,⋯ |
| ⋮ | ⋮ |

| PRINTER ID | SPECIFIC INFORMATION OF CONNECTED CARTRIDGE | SPECIFIC INFORMATION OF ORDERED CARTRIDGE | STOCK FLAG |
|---|---|---|---|
| printer_1234 | (M181) SPECIFIC INFO#A | (M182) SPECIFIC INFO#A | (M172∼M182) IN-STOCK STATE → (M184) OUT-OF-STOCK STATE |
| ... | ... | ... | ... |

FIG. 8B

| PRINTER ID | SPECIFIC INFORMATION OF CONNECTED CARTRIDGE | SPECIFIC INFORMATION OF ORDERED CARTRIDGE | STOCK FLAG |
|---|---|---|---|
| printer_1234 | (M213) SPECIFIC INFO#1 | — | OUT-OF-STOCK STATE |
| ... | ... | ... | ... |

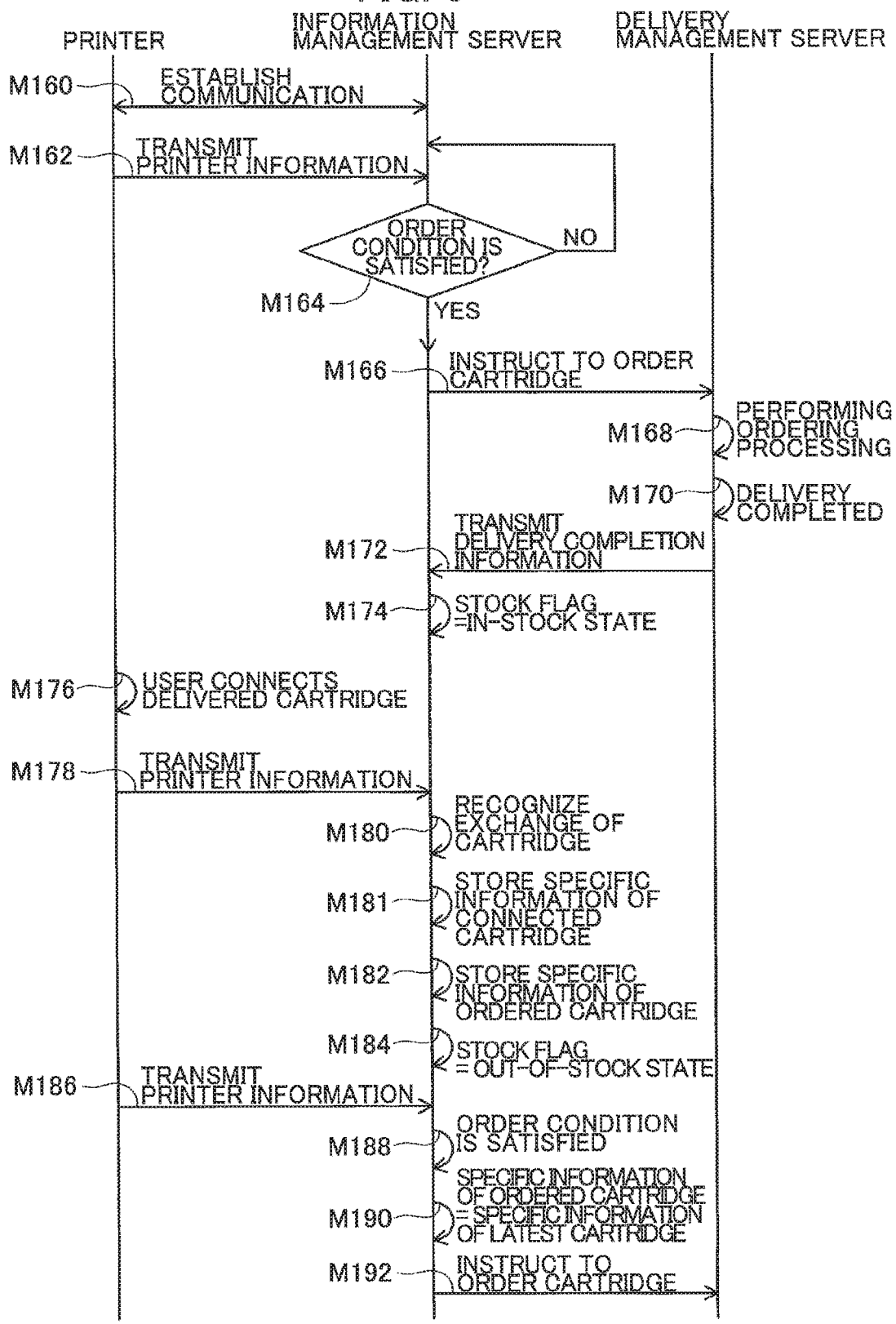

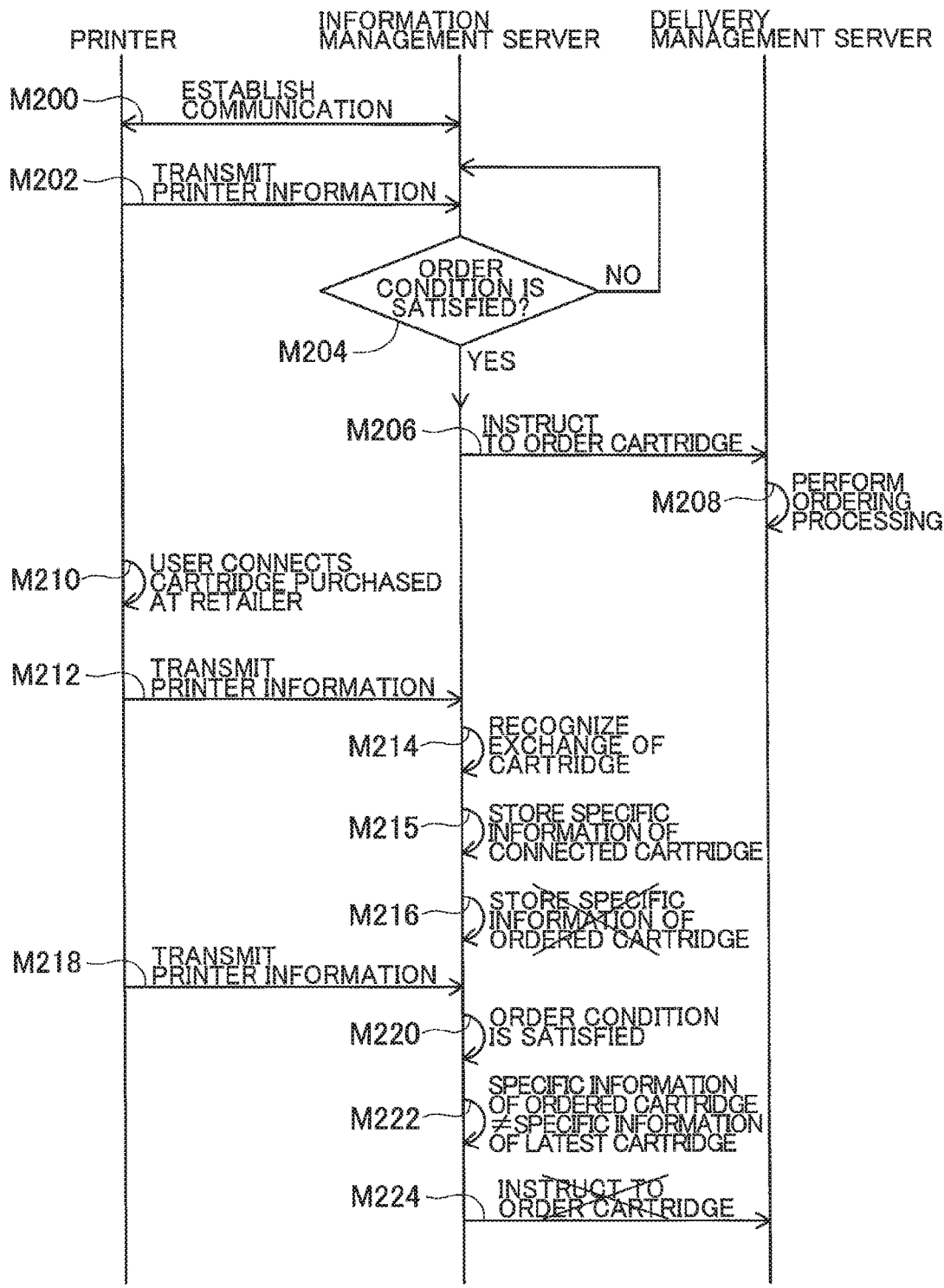

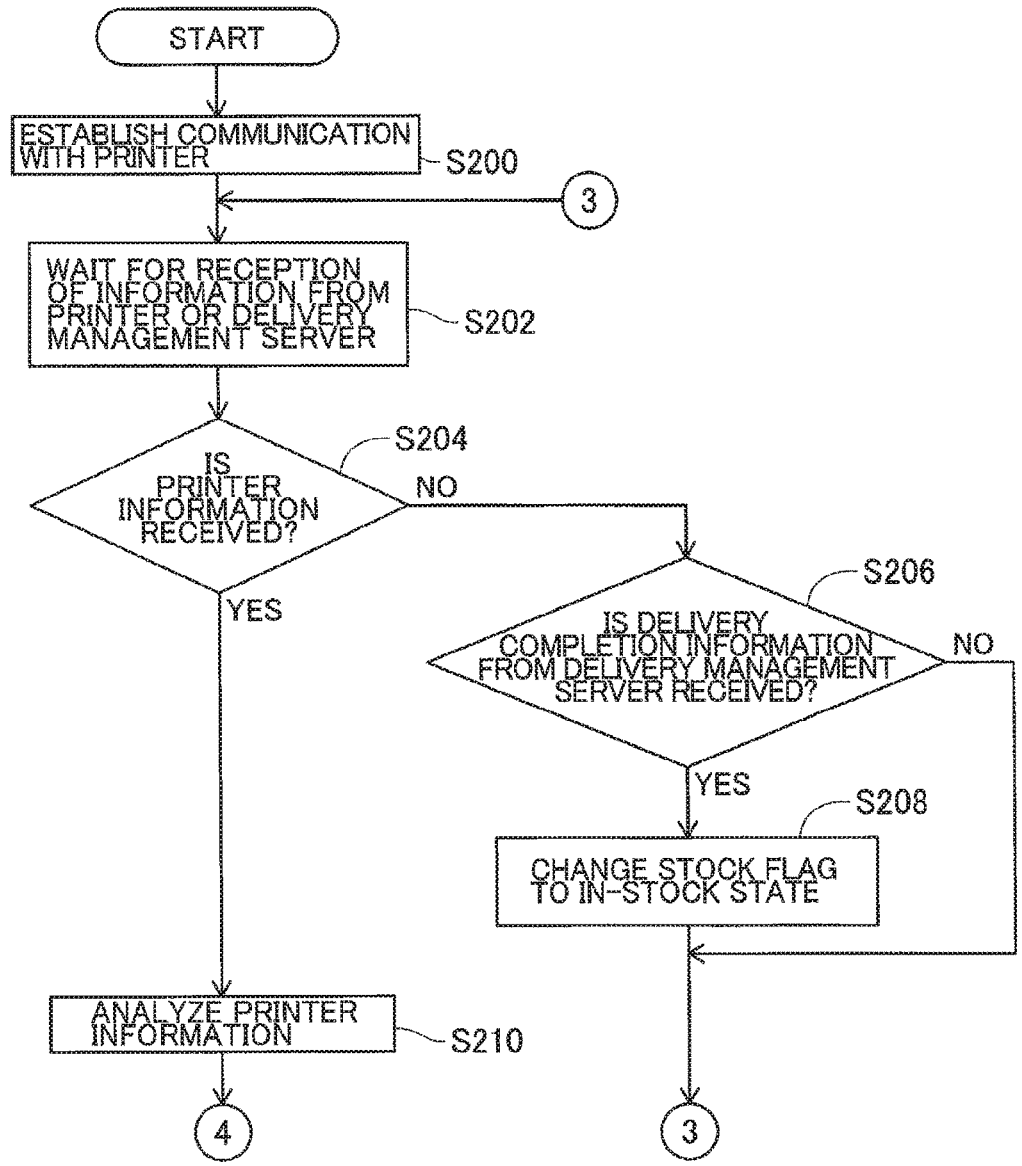

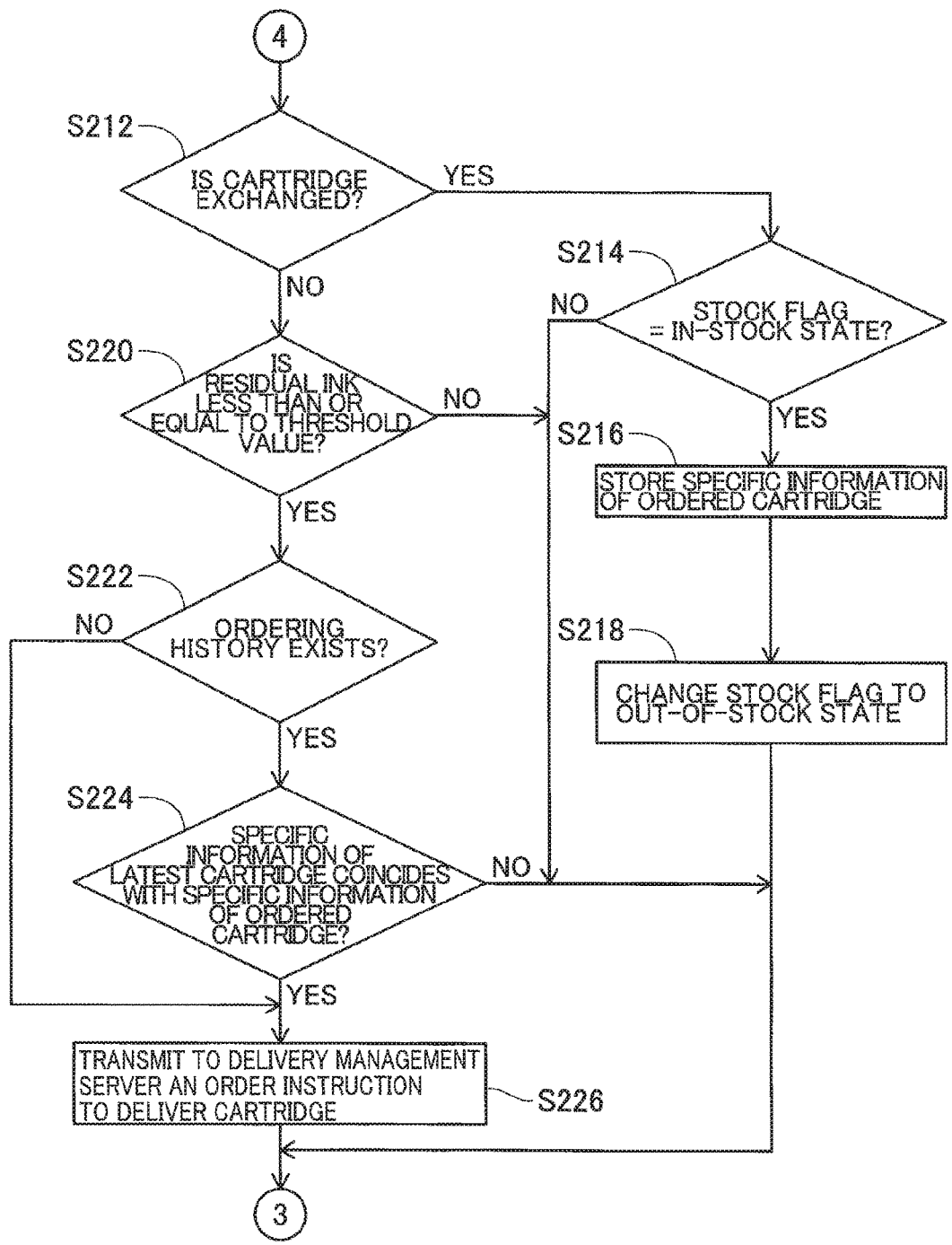

SERVER DEVICE FOR ORDERING CARTRIDGE AND PROGRAM THEREOF

CROSS REFERENCE TO RELATED APPLICATION

This application claims priority from Japanese Patent Application No. 2015-073937 filed Mar. 31, 2015. The entire content of the priority application is incorporated herein by reference.

TECHNICAL FIELD

The present disclosure relates to a server device for ordering cartridges and a program thereof.

BACKGROUND

An image recording apparatus records an image onto a recording paper by making recording material such as ink adhere on the recording paper. Thus, recording processing of the image recording apparatus involves purchase and management of consumables such as a cartridge filled with the recording material; however, the purchase and management of the consumables are troublesome to a user. Thus, in recent years, some services provide management, delivery, or the like of the cartridge. In such services, a new cartridge is ordered in response to the attachment of a spare cartridge to the image forming apparatus.

SUMMARY

Management of the cartridge can be achieved to some extent in the prior art. However, there may be a case where ink of the cartridge used in the image recording device runs short before arrival of a new cartridge delivered by the service at user's hand. In such a case, the user may purchase the cartridge at a retailer before arrival of the delivered cartridge and uses the purchased cartridge to perform print processing. The conventional management does not assume such a situation, and thus flexible cartridge management cannot be achieved. An object of the present invention is to achieve more flexible cartridge management.

It is therefore an object of the disclosure to provide a server device including a communication unit, a storage unit, and a control unit. The communication unit is configured to communicate at least with an external device. The storage unit stores device identification information for identifying an image forming apparatus communicable with the server device via the communication unit. The image forming apparatus is configured to form an image on a recording sheet by using recording material. The recording material is contained in a cartridge attachable to and detachable from the image forming apparatus. The control unit is configured to perform: (a) receiving, via the communication unit, residual amount information about residual amount of the recording material remaining in the cartridge connected to the image forming apparatus identified by the device identification information; (b) determining, based on the residual amount information, whether or not the residual amount of the recording material is equal to or less than a first threshold; (c) determining whether or not the residual amount information is about the cartridge that has been delivered in accordance with an order instruction to deliver a cartridge to a user of the image forming apparatus identified by the device identification information; and (d) in response to affirmative determination made in (b) and affirmative determination made in (c), transmitting the order instruction to the external device via the communication unit.

According to one aspect, a non-transitory computer readable storage medium stores a set of program instructions installed on and executed by a server device. The server device includes a communication unit, a storage unit, and a control unit. The communication unit is configured to communicate at least with an external device. The storage unit stores device identification information for identifying an image forming apparatus communicable with the server device via the communication unit. The image forming apparatus is configured to form an image on a recording sheet by using recording material. The recording material is contained in a cartridge attachable to and detachable from the image forming apparatus. The program instructions includes: (a1) receiving, via the communication unit, residual amount information about residual amount of the recording material remaining in the cartridge connected to the image forming apparatus identified by the device identification information; (b1) determining, based on the residual amount information, whether or not the residual amount of the recording material is equal to or less than a first threshold; (c1) determining whether or not the residual amount information is about the cartridge that has been delivered in accordance with an order instruction to deliver a cartridge to a user of the image forming apparatus identified by the device identification information; and (d1) in response to affirmative determination made in (b1) and affirmative determination made in (c1), transmitting the order instruction to the external device via the communication unit.

According to another aspect, an automatic cartridge ordering system includes an image forming apparatus, and a server device. The image forming apparatus is configured to form an image on a recording sheet by using recording material. The recording material is contained in at least one cartridge attachable to and detachable from the image forming apparatus. The server device includes a communication unit configured to communicate at least with the image forming apparatus and an external device, a storage unit storing device identification information for identifying the image forming apparatus connected to the communication unit, and a control unit. The control unit is configured to perform: (a2) receiving, via the communication unit, residual amount information about residual amount of the recording material remaining in the cartridge connected to the image forming apparatus identified by the device identification information; (b2) determining, based on the residual amount information, whether or not the residual amount of the recording material is equal to or less than a first threshold; (c2) determining whether or not the residual amount information is about the cartridge that has been delivered in accordance with an order instruction to deliver a cartridge to a user of the image forming apparatus identified by the device identification information; and (d2) in response to affirmative determination made in (b2) and affirmative determination made in (c2), transmitting the order instruction to the external device via the communication unit.

BRIEF DESCRIPTION OF THE DRAWINGS

The particular features and advantages of the disclosure will become apparent from the following description taken in connection with the accompanying drawings, in which:

FIG. 2 is a schematic diagram of a management table stored in a data storage area of an information management server according to the first embodiment;

FIG. 3 is a schematic diagram of a management table stored in a delivery management server according to the first embodiment;

FIGS. 8A and 8B are a schematic diagram of a management table stored in a data storage area of an information management server according to a second embodiment;

FIG. 9 is a sequence diagram indicating operation of a communication system according to the second embodiment;

FIG. 10 is a sequence diagram indicating operation of the communication system according to the second embodiment;

FIG. 11 is a workflow of the information management server according to the second embodiment; and FIG. 12 is a workflow of the information management server according to the second embodiment.

DETAILED DESCRIPTION

Figure 1:
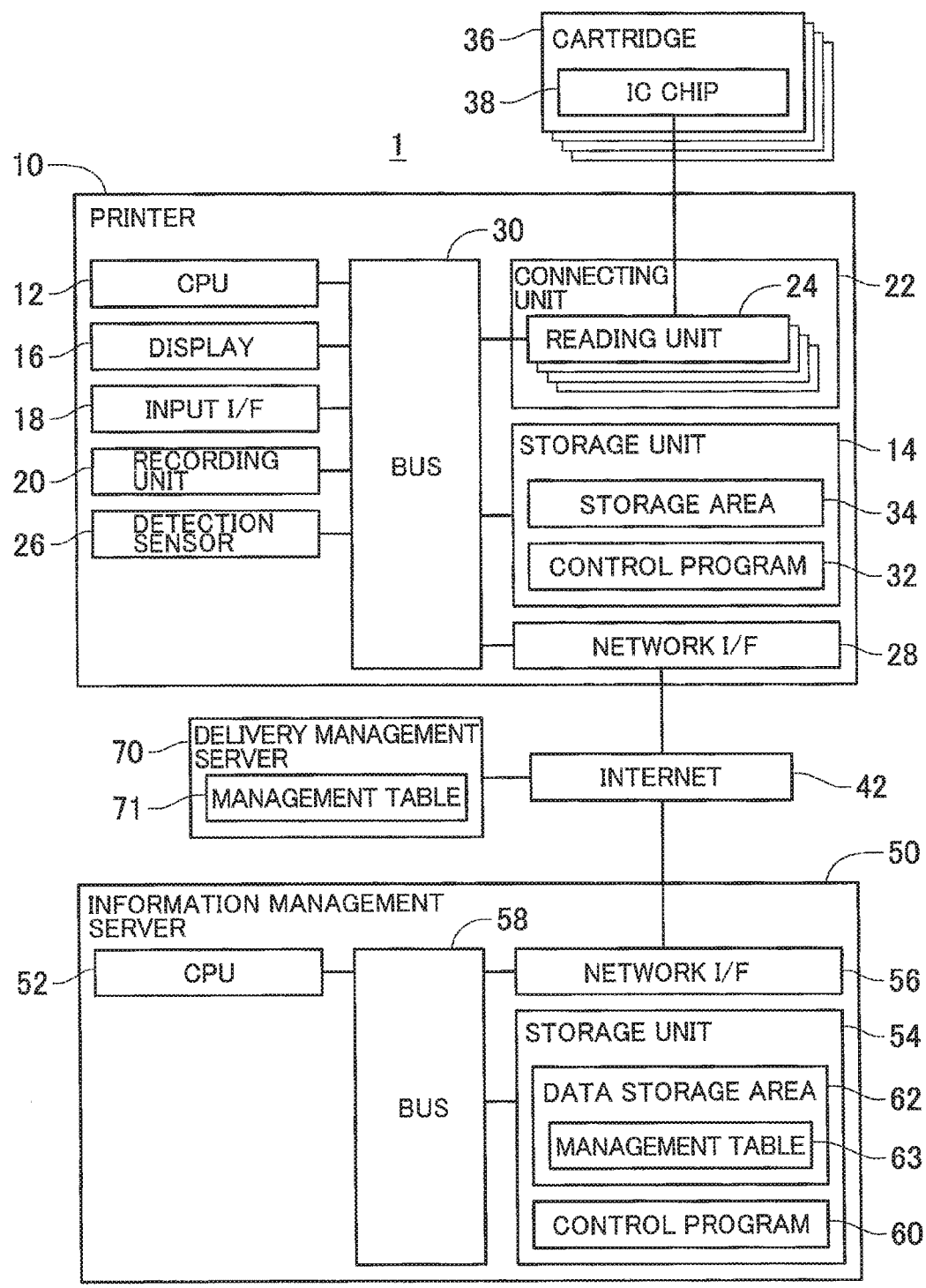
FIG. 1 is a block diagram of a communication system according to a first embodiment.
Figure 4:
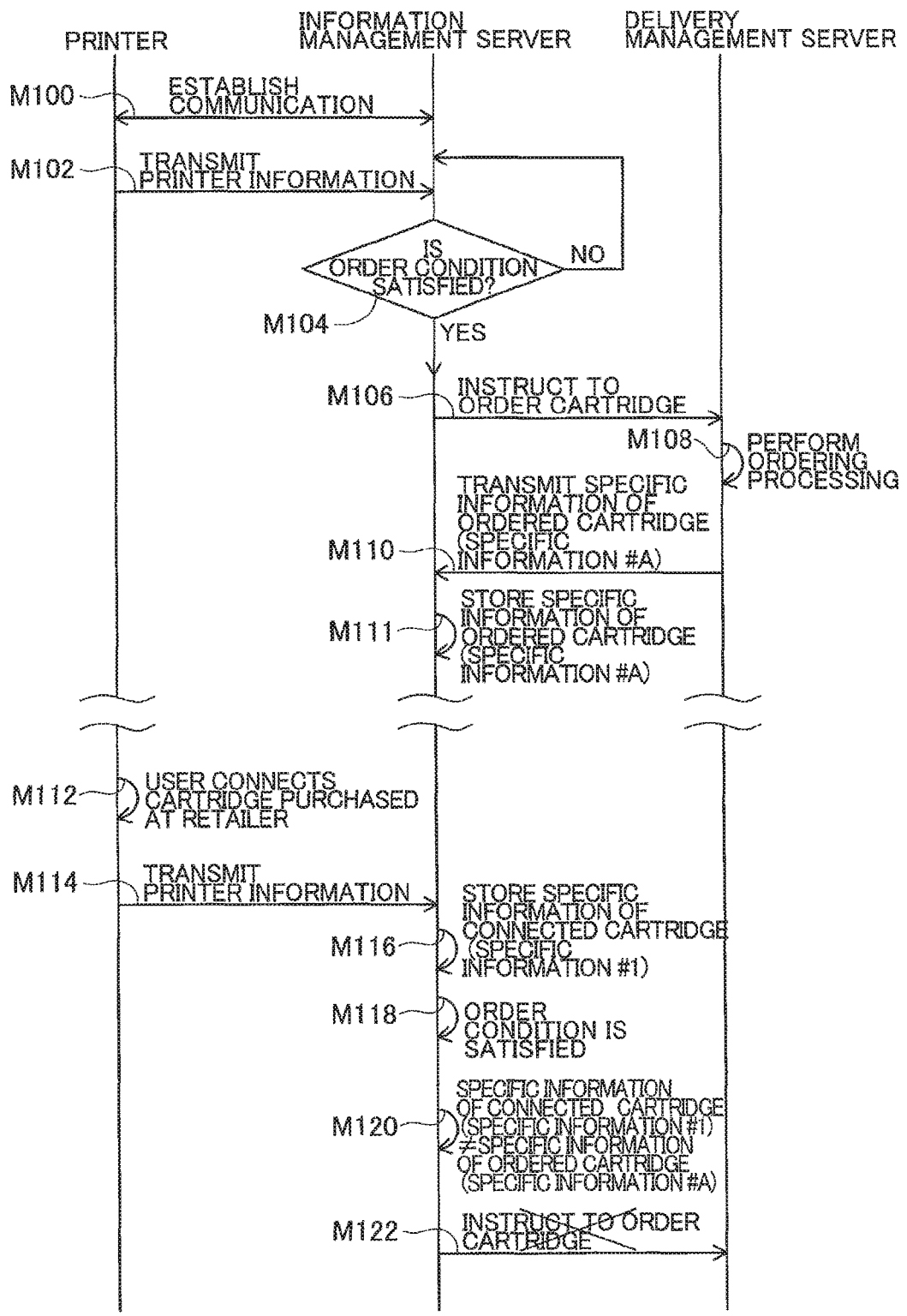
FIG. 4 is a sequence diagram indicating operation of the communication system according to the first embodiment.

A Communication system according to a first embodiment will be described while referring to the accompanying drawings wherein like parts and components are designated by the same reference numerals to avoid duplicating description.

<Configuration of Communication System>

FIG. 1 is a block diagram of a communication system 1 exemplified as an embodiment of the present disclosure. The communication system 1 includes a printer 10, an information management server 50, and a delivery management server 70. Printer 10 is an example of an image recording apparatus. Information management server 50 is an example of a server device. The delivery management server 70 is an example of an external device.

The printer 10 mainly includes a CPU (Central Processing Unit) 12, a storage unit 14, a display 16, an input I/F 18, a recording unit 20, a connecting unit 22, a reading unit 24, a detection sensor 26, and a network I/F 28. These components are capable of communicating with each other via a bus 30.

The CPU 12 executes processing in accordance with a control program 32 in the storage unit 14. The control program 32 is a program for managing a residual amount of ink to be used in the printer 10 and purchasing a cartridge 36 using the information management server 50. The storage unit 14 is a combination of a RAM (Random Access Memory), a ROM (Read Only Memory), a flash memory, an HDD (Hard Disk Drive) and a buffer of the CPU 12. Further, the storage unit 14 has a data storage area 34. The data storage area 34 is an area for storing data required to execute the control program 32.

The display 16 displays various screens on the basis of input image data. The display 16 may be, but not limited to, an LCD (Liquid Crystal Display) or an organic EL (Electro Luminescence). The input I/F 18 has keys for a user to execute functions of the printer 10. The input I/F 18 may be, for example, a touch panel integrally formed with the display 16 and receives a user operation for an icon displayed on the display 16. The input I/F 18 may have a hard key instead of the touch panel.

The recording unit 20 serves as a print mechanism and has an inkjet head. The CPU 12 inputs a drive signal to the recording unit 20, causing the inkjet head to eject ink in response to the input drive signal. The connection unit 22 is connected to a cartridge 36 filled with ink to be used in the recording unit 20. The connection unit 22 can be connected with the plurality of cartridges 36 corresponding to a plurality of ink colors. The cartridge 36 is attached with an IC chip 38 storing a serial ID for identifying the cartridge 36. The specific information includes two types of information, i.e., a model number of the cartridge 36 and a serial ID as a unique identifier for uniquely identifying the cartridge 36. That is, there may be two cartridges 36 that have the same model number, i.e. the character strings representing the model number are exactly the same between the two cartridges 36. On the contrary, any two cartridges 36 never have the same serial ID, even if the two cartridges 36 have the same model number. The specific information of one cartridge 36 is therefore unique among other cartridges 36. In the embodiment, the model number is different from each color; in other words, the ink color of the cartridge 36 can be designated by identifying the model number. The reading unit 24 reads the serial ID from the IC chip 38 of the cartridge 36 connected to the connection unit 22. The detection sensor 26 detects a residual amount of ink in the cartridge 36 connected to the connection unit 22. The serial ID is an example of cartridge identification information or third information.

The network I/F 28 is capable of communicating with an external device and is connected to Internet 42 via a router, not illustrated. The internet 42 is connected to the information management server 50 and the delivery management server 70. With this configuration, the printer 10 can perform data communication with the information management server 50 via the network I/F 28.

The information management server 50 mainly includes a CPU 52, a storage unit 54, and a network I/F 56. These components are capable of communicating with each other via a bus 58. The CPU 52 is an example of a control unit and a computer. The network I/F 56 is an example of a communication unit.

Figure 5:
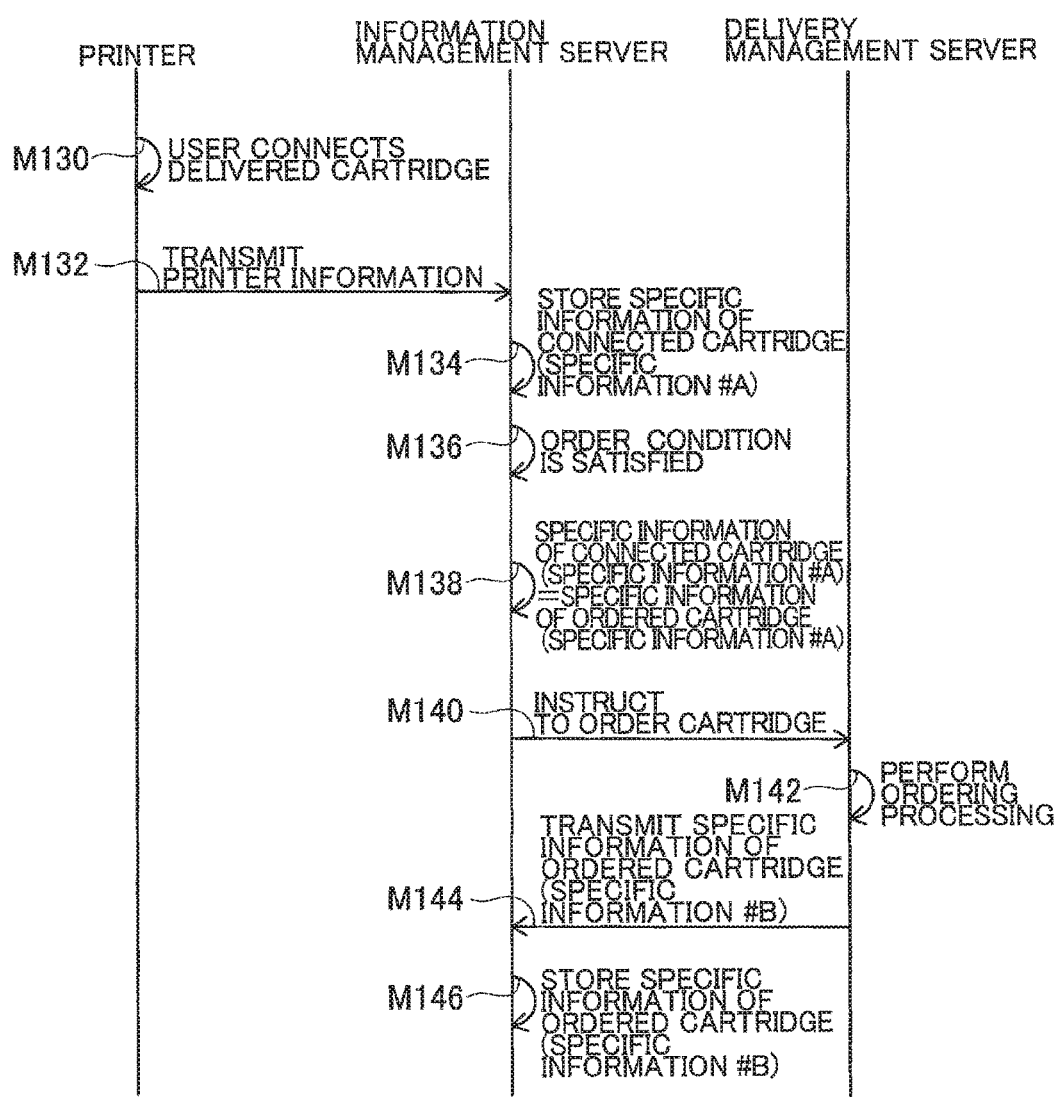
FIG. 5 is a sequence diagram indicating operation of the communication system according to the first embodiment.

The CPU 52 executes processing based on a control program 60 in the storage unit 54. The control program 32 is a program for managing a residual amount of ink used in the printer 10 and purchasing the cartridges 36. Hereinafter, the CPU 52 that executes the control program 60 is also referred to simply by a program name thereof. For example, "control program 60" may represent "CPU 52 that executes the control program 60". The storage unit 54 is a combination of a RAM, a ROM, a flash memory, an HDD, and a buffer of the CPU 52. The storage unit 54 further has a data storage area 62. The data storage area 62 is an area for storing data required to execute the control program 60 and stores a management table 63 illustrated in FIG. 5. The control program 60 is an example of a control program. The data storage area 62 is an example of a storage unit.

The network I/F 56 communicates with an external device, and is connected to the delivery management server 70 on the Internet 42 and the printer 10 via a router, not illustrated. With this configuration, the information management server 50 can perform data communication with the printer 10 and the delivery management server 70 via the network I/F 56. The delivery management server 70 stores a management table 71 illustrated in FIG. 3.

<Management of Ink Utilizing Communication System>

In the communication system 1, the information management server 50 manages ink consumption (ink is example of recording material). When a residual amount of ink used in the printer 10 becomes equal to or less than a threshold amount, the information management server 50 transmits, to the delivery management server 70, an order instruction of the cartridge 36 corresponding to this ink. The delivery management server 70 orders the cartridge 36, and the cartridge 36 will be delivered to the user of the printer 10. Accordingly, the user can save time with little effort in the management of purchase and the residual amount of ink in the cartridge 36, and the system 1 can therefore improve user's convenience. However, there may be a case where the user himself/herself purchases the cartridge 36 at a retailer and connects the purchased cartridge 36 to the connection unit 22 to perform print processing. When the cartridge 36 is ordered in such a case, a plurality of cartridges may be disadvantageously in stock at user's hand. Thus, preferably, in such a case, the order of the cartridge 36 is avoided.

More in detail, for example, in response to a reduction in the amount of the ink of the cartridge 36 connected to the connection unit 22, the information management server 50 transmits an order instruction for instructing the delivery management server 70 to deliver the cartridge 36. Normally, the user uses the cartridge 36 delivered in accordance with the order; however, for some reasons, the user himself/herself may purchase the cartridge 36 at a retailer and connects the purchased cartridge 36 to the connection unit 22 to perform print processing. In such a case, the ordered cartridge 36 is left as a stock at user's hand. Then, when ink of the cartridge 36 connected to the connection unit 22, that is, ink of the cartridge 36 that the user him or herself has purchased at a retailer is reduced, the information management server 50 transmits the order instruction to the delivery management server 70. In such a case, the ordered cartridge 36 has already been in stock, so that the order of the cartridge 36 is preferably avoided. In view of this, in the communication system 1, when the cartridge 36 being used in the printer 10 is not the ordered cartridge, the cartridge 36 is not ordered even if a residual amount of ink of the cartridge 36 becomes equal to or less than a threshold amount.

Specifically, after purchasing the printer 10, the user makes a contract with a predetermined company for an ink management service using the information management server 50. Then, the user connects starter cartridges 36 as one set in the package of the printer 10 to the connecting unit 22, and executes print processing. Further, according to the contract, a serial ID of the printer 10 (hereinafter, also referred to as "printer ID"), which is an object of the contract, is registered in the information management server 50. The printer ID and a user ID are registered in correlation with each other in the delivery management server 70. The user ID includes an address and a name of a contractor. The printer ID is an example of device identification information.

In the printer 10, when print processing is executed by consuming ink in the cartridge 36 as a starter kit in the package of the printer 10, communication is established between the printer 10 and the information management server 50 (FIG. 2: M100). Then, in the printer 10, the detection sensor 26 periodically detects the residual amount of ink in each color in the cartridges 36, which are connected to the connecting unit 22. Information of the detected residual amount of ink in each color (hereinafter, also referred to as "ink information") is transmitted from the printer 10 to the information management server 50 (M102). In other words, the ink information includes ink colors and the residual amount of ink in correlation with each ink color. The information of the detected residual amount of ink or the ink information is an example of residual amount information.

When the detection sensor 26 detects the residual amount of ink, the IC chip 38 of the cartridge 36 connected to the connecting unit 22 is read by the reading unit 24, and the printer 10 acquires the specific information of the connected cartridge 36. When the ink information is transmitted to the information management server 50, the specific information of the connected cartridge 36, the printer ID, and the ink information of the printer 10 are transmitted to the information management server 50. The ink information, the specific information of the connected cartridge 36, and the printer ID that are transmitted to the information management server 50 are also collectively referred to as "printer information", hereinafter.

Upon reception of the printer information, the information management server 50 analyzes the printer information. In the analysis of the printer information, the information management server 50 performs a determination using the specific information of the connected cartridge 36 in the printer information and another determination employing the ink information in the printer information. More in detail, the specific information of the connected cartridge 36 and the specific information of the ordered cartridge 36, which are corresponding to each printer ID, are stored in correlation with each other in the management table 63, as illustrated in FIG. 2.

When the specific information of the connected cartridge 36 received this time coincides with the specific information of the connected cartridge 36 received previous time, the information management server 50 determines that the cartridge 36 connected to the connecting unit 22 has not been exchanged. Otherwise, when the specific information of the connected cartridge 36 received this time does not coincide with the specific information of the connected cartridge 36 received previous time, the information management server 50 determines that the cartridge 36 has been exchanged and connected to the connecting unit 22. In the embodiment, the cartridge 36 is in the package of the printer 10 as a starter kit, and connected to the connecting unit 22 of the printer 10. The specific information of the connected cartridge 36 received this time therefore coincides with the specific information of the connected cartridge 36 received previous time, and the information management server 50 determines that the cartridge 36 has not been exchanged.

In the analysis of the printer information, the information management server 50 determines whether an order condition of cartridge 36 is satisfied on the basis of the ink information in the printer information (M104). Specifically, the information management server 50 determines whether the residual amount of ink in each color indicated by the ink information is less than or equal to a threshold amount. When the ink residual amount indicated by the ink information is more than a threshold amount, the information management server 50 determines that the order condition is not satisfied, so that the cartridge 36 is not ordered. Otherwise, when the ink residual amount indicated by the ink information is equal to or less than a threshold amount, the information management server 50 determines that the order condition is satisfied. The information management server 50 then transmits, to the delivery management server 70, the order instruction of the cartridge 36 in the ink color corresponding to the ink information (M106). Incidentally, the order instruction includes the model number of the cartridge 36 in the ink color that is determined to satisfy the order condition, so that the delivery management server 70 can specify the model number of the cartridge 36 that needs to be delivered in the ordering processing. The information management server 50 transmits together with the order instruction, to the delivery management server 70, the ink information used for the determination and the printer ID received from the printer 10. Upon reception of the order instruction, the delivery management server 70 performs ordering processing of the cartridge 36 specified by the received model number (M108).

More in detail, as illustrated in FIG. 3, the above-mentioned printer ID and the user ID are stored in the delivery management server 70 in correlation with each other. The delivery management server 70 extracts the user ID registered in correlation with the printer ID received together with the order instruction, and outputs an instruction to a delivery agent to deliver the cartridge 36 to a user identified by the user ID. Then, the delivery agent delivers the cartridge 36 to the user.

After execution of the ordering processing, the delivery management server 70 transmits, to the information management server 50, a specific information of the cartridge 36 delivered in accordance with the ordering processing (M110). Here, the specific information of the ordered cartridge 36 is also referred to as "specific information of the ordered cartridge 36". For convenience, the specific information of the ordered cartridge 36 transmitted from the delivery management server 70 to the information management server 50 in M110 is assumed to be "specific information #A". Then, upon reception of the specific information of the ordered cartridge 36, the information management server 50 stores the specific information of the ordered cartridge 36 in the management table 63 (M111).

When the ink has run short before arrival of the cartridge 36 delivered in accordance with the ordering processing of the delivery management server 70, the user may purchase the cartridge 36 at a retailer. In such a case, the user usually removes the empty cartridge 36 connected to the connection unit 22, and connects the cartridge 36 that the user has purchased to the connection unit 22 (M112).

The printer 10 periodically detects the ink residual amount and reads the specific information of the connected cartridge 36, and periodically transmits the printer information to the information management server 50 (M114). The information management server 50 then analyzes the received printer information. As described above, if the cartridge 36 connected to the connection unit 22 has been exchanged in the printer 10, the information management server 50 determines that the specific information of the connected cartridge 36 received this time does not coincide with that received previous time. In such a case, a field for the specific information of the connected cartridge 36 in the management table 63 is overwritten by the specific information received this time (M116). For convenience, the specific information of the connected cartridge 36 stored in M116 is assumed to be "specific information #1". That is, the specific information of the cartridge 36 that is connected to the connection unit 22 in M112 is "specific information #1".

Further, the information management server 50 analyzes the printer information received in M114 to determine whether the order condition is satisfied for each ink color, based on the ink information in the printer information.

When determining that the order condition is satisfied (M118), the information management server 50 determines whether the specific information of the ordered cartridge 36 stored in the management table 63 coincides with the specific information of the connected cartridge 36 that satisfies the order condition. More specifically, the information management server 50 determines whether the specific information of the ordered cartridge 36 delivered in accordance with the ordering processing in M108 coincides with the specific information of the connected cartridge 36 that is connected to the connection unit 22 in M112. Incidentally, the determination is performed in the same ink color. That is, the determination is performed between the specific information of the connected cartridge 36 and the specific information of the ordered cartridge 36 in the same ink color as the connected cartridge 36.

In this explanation, the specific information of the ordered cartridge 36 stored in the management table 63 is "specific information #A", and the specific information of the connected cartridge 36 is "specific information #1." Accordingly, the information management server 50 determines that the specific information of the ordered cartridge 36 is different from the specific information of the connected cartridge 36 (M120). That is, the information management server 50 determines that the ink information received together with the "specific information #1" in the printer information received in M114 is different from the ink information including "specific information #A" (i.e. the ink information of the cartridge 36 delivered in accordance with the ordering processing). Accordingly, it is estimated that the connection unit 22 is connected with the cartridge 36 (specific information #1), which is different from the cartridge 36 (specific information #A) delivered in accordance with the ordering processing. It is also estimated that the cartridge 36 delivered in accordance with the ordering processing is in stock at user's hand. The information management server 50 does not transmit the order instruction even when determining that the order condition is satisfied (M122), on the basis of the ink information.

For example, when ink is empty in the printer 10, the cartridge 36 is dispatched in accordance with the ordering processing of the delivery management server 70. If the shipped cartridge 36 is delivered to the user, the user usually removes the empty cartridge 36 connected to the connection unit 22 and then connects the delivered cartridge 36 to the connection unit 22 (see FIG. 5: M130).

The printer 10 periodically detects the ink residual amount and reads the specific information of the connected cartridge 36. The printer 10 also periodically transmits the printer information to the information management server 50 (M132). The information management server 50 analyzes the received printer information. As described above, if the cartridge 36 connected to the connection unit 22 has been exchanged in the printer 10, the information management server 50 determines that the specific information of the connected cartridge 36 received this time does not coincide with that received previous time. In such a case, the specific information of the connected cartridge 36 received this time is overwritten and stored in the management table 63 as illustrated in FIG. 2 (M134). In M130, the cartridge 36 delivered in accordance with the ordering processing (that is, the cartridge 36 with "specific information #A") is connected to the connection unit 22, so that the specific information of the connected cartridge 36 stored in M134 is "specific information #A".

In the analysis of the printer information received in M130, the information management server 50 determines for each ink color whether the order condition is satisfied, on the basis of the ink information in the printer information. When determining that the order condition is satisfied (M136), the information management server 50 then determines whether the specific information in the management table 63 is in coincidence between the ordered cartridge 36 and the connected cartridge 36 that satisfies the order condition. In detail, the information management server 50 determines whether the specific information of the ordered cartridge 36 delivered to the user in accordance with the ordering processing in M108 coincides with the specific information of the cartridge 36 connected to the connection unit 22 in M130. Here, the determination is performed in the same ink color. That is, the determination is performed between the specific information of the connected cartridge 36 and the specific information of the ordered cartridge 36 in the same ink color as the connected cartridge 36.

In this description, the specific information of the ordered cartridge 36 in the management table 63 is "specific information #A", and the specific information of the connected cartridge 36 is "specific information #A." Therefore, the information management server 50 determines that the specific information of the ordered cartridge 36 coincides with the specific information of the connected cartridge 36 (M138). Since the connection unit 22 is connected with the cartridge 36 ("specific information #A") delivered to the user in accordance with the ordering processing, the cartridge 36 is out of stock at the user. Thus, in response to the determination that the order condition is satisfied on the basis of the ink information, the information management server 50 transmits the order instruction to the delivery management server 70 (M140).

Upon reception of the order instruction, the delivery management server 70 executes the cartridge 36 ordering processing (M142). The delivery management server 70 then transmits, to the information management server 50, the specific information of the ordered cartridge 36 shipped in accordance with the ordering processing (M144). Here, it is assumed here that the specific information of the ordered cartridge 36 transmitted at this time is "specific information #B". Upon reception of the specific information of the ordered cartridge 36, the information management server 50 overwrites the received specific information of the ordered cartridge 36 in the management table 63 (M146). As a result, the specific information of the ordered cartridge 36 "specific information #B" is used in the subsequent determination.

As described above, in the communication system 1, the cartridge 36 is ordered, when the information management server 50 determines that the specific information coincides between the ordered cartridge 36 and the connected cartridge 36 and that the order condition is satisfied. Otherwise, the cartridge 36 is not ordered in the state where the specific information of the ordered cartridge 36 differs from that of the connected cartridge 36, even when the information management server 50 determines that the order condition is satisfied. This can prevent excess stock at user's hand. Further, as described above, the printer 10 can connect with the cartridges 36 respectively containing each of different ink colors. Thus, the above described management of the ink cartridge 36 can be executed for each color.

As described above, when determining in S104 that the order condition is satisfied, the information management server 50 does not determine whether the specific information of the ordered cartridge 36 coincides with that of the connected cartridge 36. This is because the order of the cartridge 36 in M106 is the first order for the printer 10, and usually the cartridge 36 is therefore out of stock at the user.

In the communication system 1, the cartridge 36 is ordered as long as it is the first order and the order condition is satisfied. To rephrase this, the first order is determined irrespective of whether the specific information of the ordered cartridge 36 coincides with that of the connected cartridge 36.

<Control Program>

The ink management processing and the ordering processing for cartridge 36 described above are performed upon execution of the control program 60 by the CPU 52 in the information management server 50. Hereinafter, a processing flow for execution of the control program 60 will be described using FIGS. 6 and 7.

Figure 6:
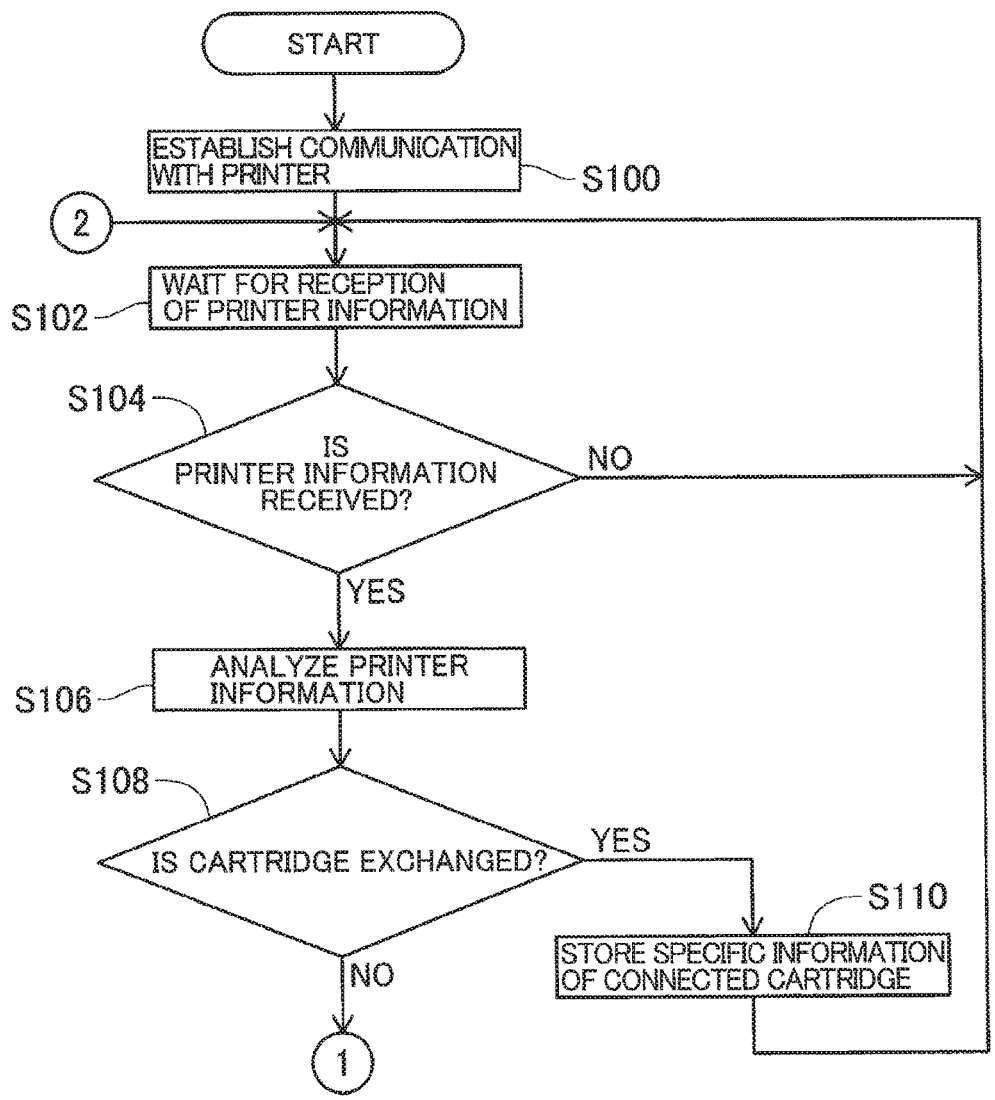
FIG. 6 is a workflow of the information management server according to the first embodiment.
Figure 7:
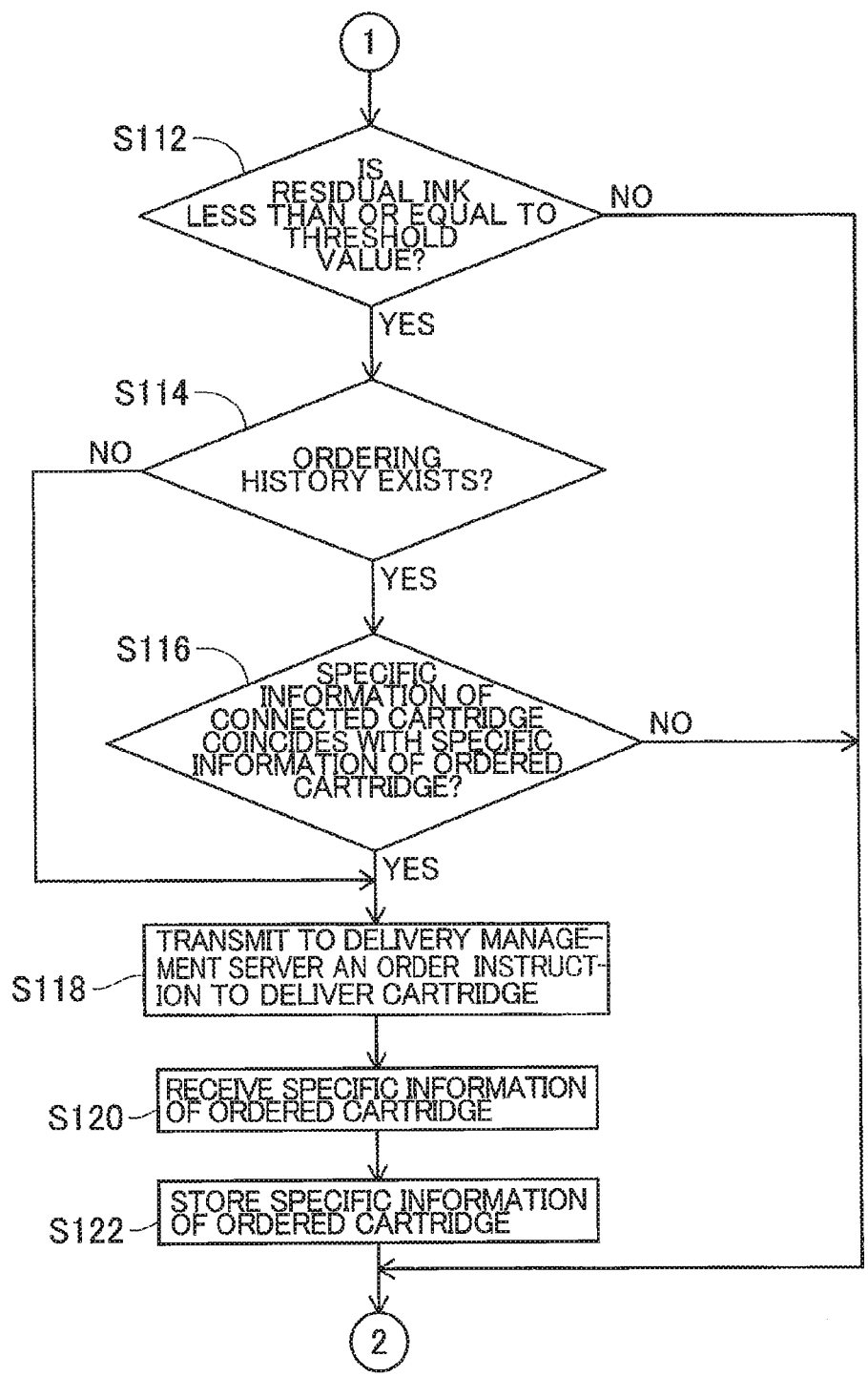
FIG. 7 is a workflow of the information management server according to the first embodiment.

As illustrated in FIG. 6, when the control program 60 is executed by the CPU 52, communication is established between the printer 10 and the information management server 50 (S100). Then, the information management server 50 waits for reception of the printer information from the printer 10 (S102). Then, the CPU 52 determines whether the printer information has been received from the printer 10 (S104). When it is determined that the printer information has not been received (NO in S104), the processing flow returns to S102. Otherwise, when it is determined that the printer information has been received (YES in S104), the received printer information is analyzed (S106).

On the basis of the specific information of the connected cartridge 36 in the printer information, the CPU 52 then determines whether the cartridge 36 connected to the connecting unit 22 has been exchanged (S108). When it is determined that the cartridge 36 has been exchanged (YES in S108), the specific information of the connected cartridge 36 in the printer information received in S104 is stored in the management table 63 (S110). Then, the processing flow returns to S102.

Otherwise, when the information management server 50 determines that the cartridge 36 has not been exchanged (NO in S108), the CPU 52 determines, on the basis of the ink information in the received printer information, whether the ink residual amount for each ink color indicated in the ink information is equal to or less than a threshold amount (S112). When the information management server 50 determines that the ink residual amount indicated in the ink information is more than a threshold amount (NO in S112), the processing flow returns to S102. Otherwise, when it is determined that the ink residual amount indicated by the ink information is equal to or less than a threshold amount (i.e. if there exists the cartridge 36 whose residual amount of ink is not more than the threshold value) (YES in S112), the CPU 52 examines presence of an ordering history corresponding to the user of the printer 10 for the same ink color as the cartridge 36. That is, the CPU 52 determines whether the ordering processing corresponding to the user of the printer 10 for the same color as the cartridge 36 whose residual amount of ink is not more than the threshold value has been made for the first time (S114).

When the CPU 52 determines that there exists an ordering history corresponding to the user of the printer 10 for the same ink color as the cartridge 36 whose residual amount of ink is not more than the threshold value (YES in S114), that is, when the CPU 52 determines that the ordering processing for the same ink color is not the first time, the CPU 52 determines whether the specific information of the connected cartridge 36 coincides with the specific information of the ordered cartridge 36 (S116). When the information management server 50 determines that the specific information of the connected cartridge 36 do not coincide with that of the ordered cartridge 36 (NO in S116), the processing flow returns to S102. Otherwise, when the CPU 52 determines that the specific information of the connected cartridge 36 coincides with that of the ordered cartridge 36 (YES in S116), the order instruction is transmitted to the delivery management server 70 (S118).

When the CPU 52 determines that the ordering history for the user of the printer 10 is absent (NO in S114), that is, when the information management server 50 determines that it would be the first ordering processing for the user of the printer 10, S116 is skipped and the order instruction is transmitted to the delivery management server 70 (S118). When the order instruction is transmitted to the delivery management server 70, the information management server 50 receives the specific information of the ordered cartridge 36 from the delivery management server 70 (S120) and stores the received specific information of the ordered cartridge 36 in the management table 63 (S122). Then, the processing flow returns to S102.

Second Embodiment

In the communication system 1 of the first embodiment, on the basis of the specific information of the ordered cartridge 36 transmitted from the delivery management server 70, it is determined whether the cartridge 36 connected to the connection unit 22 of the printer 10 is the cartridge 36 delivered in accordance with the ordering processing. On the other hand, in a communication system 1 of a second embodiment, by using another method, it is determined whether the cartridge 36 connected to the connection unit 22 of the printer 10 is the cartridge 36 delivered in accordance with the ordering processing. In the second embodiment, instead of the management table 63, a management table 64 illustrated in FIGS. 8A and 8B is stored in the data storage area 62. The management table 64 is a table for storing the printer ID, the specific information of the connected cartridge 36, the specific information of the ordered cartridge 36, and a stock flag in correlation with each other.

The following describes, using FIG. 9, a case where the order condition is satisfied and where the cartridge 36 connected to the printer 10 is the cartridge 36 delivered in accordance with the ordering processing. In the example of FIG. 9, the management table 64 illustrated in FIG. 8A is used. Specifically, as in the communication system 1 of the first embodiment as well as the communication system 1 of the second embodiment, communication between the printer 10 and the information management server 50 is established (see FIG. 9: M160). Then, in the printer 10, detection of the residual amount of ink and reading of the specific information of the connected cartridge 36 are periodically performed, and the printer information is periodically transmitted from the printer 10 to the information management server 50 (M162).

Upon reception of the printer information, the information management server 50 analyzes the received printer information. In the analysis of the printer information, the information management server 50 determines for each ink color, on the basis of the ink information in the printer information, whether the order condition is satisfied (M164). When determining that the order condition is satisfied, the information management server 50 transmits, to the delivery management server 70, the order instruction of the cartridge 36 for the ink corresponding to the ink information (i.e. the string information corresponding to the model number in the specific information of the connected cartridge 36 whose ink color is determined to satisfy the order condition) (M166).

As in the first embodiment, the order instruction includes the printer ID. Thus, upon reception of the order instruction, the delivery management server 70 outputs, to a delivery agent, an instruction to deliver cartridge 36 to a user identified by the user ID in the management table 71 in correlation with the printer ID.

Further, the delivery management server 70 receives a cartridge 36 delivery state from a delivery agent. After the delivery agent has delivered the cartridge 36 to the user, a notification indicating completion of the delivery is transmitted to the delivery management server 70. As a result, the delivery management server 70 recognizes that the cartridge 36 has been delivered at user's hand (M170). Then, the delivery management server 70 transmits, to the information management server 50, information (hereinafter, referred to as "delivery completion information") indicating that the delivery of the cartridge 36 to the user has been completed (M172). Upon reception of the delivery completion information, the information management server 50 set a stock flag of the management table 64 to an in-stock state, as illustrated in FIG. 8A.

The stock flag is a flag indicating whether the cartridge 36 delivered in response to the ordering processing is in stock at the user of the printer 10. The stock flag can be set to either of an in-stock state or an out-of-stock state. When the stock flag is set to the in-stock state, the cartridge 36 delivered in response of the ordering processing is in stock the user of the printer 10. Otherwise, when the stock flag is set to the out-of-stock state, the cartridge 36 delivered in accordance with the ordering processing is not in stock the user of the printer 10.

When the ink is empty in the printer 10, the user removes the empty cartridge 36 connected to the connection unit 22 and connects the cartridge 36 delivered in accordance with the ordering processing to the connection unit 22 (M176). The printer 10 periodically detects the residual amount of ink and reads the specific information of the connected cartridge 36. The printer 10 also periodically transmits the printer information to the information management server 50 (M178).

Then, upon reception of the printer information, the information management server 50 analyzes the printer information. As described above, in the printer 10, the cartridge 36 connected to the connection unit 22 has been exchanged, so that the information management server 50 determines, on the basis of the specific information of the connected cartridge 36 in the printer information, the specific information of the connected cartridge 36 received this time does not coincide with the specific information stored in the management table 64. That is, the information management server 50 recognizes that the cartridge 36 has been exchanged in the printer 10 (M180). The information management server 50 then overwrites the management table 64 with the specific information of the connected cartridge 36 in the received printer information (M181). For convenience, it is assumed that the specific information of the connected cartridge 36 is "specific information #A".

As described above, the information management server 50 has received the delivery completion information, and the stock flag is thus set to the in-stock state in M174. That is, the cartridge 36 delivered in accordance with the ordering processing following the exchange of the cartridge 36 in the printer 10 is in stock at user's hand. Thus, it is estimated that the cartridge 36 exchanged and connected this time to the connection unit 22 is the cartridge 36 delivered in accordance with the ordering processing. Then, the information management server 50 stores the "specific information #A"

received this time in the data storage area 62 as the specific information of the ordered cartridge 36 (M182). That is, in a case where the stock flag is set in the in-stock state and where exchanging of the cartridge 36 in the printer 10 has been recognized, the specific information of the ordered cartridge 36 received this time is stored in the data storage area 62. In the data storage area 62, the specific information of the ordered cartridge 36 as a default value has been previously stored. Upon storage of new specific information of the ordered cartridge 36, the new specific information of the ordered cartridge 36 is overwritten on the stored specific information of the ordered cartridge 36. Since the cartridge 36 delivered in accordance with the ordering processing is exchanged and connected to the connection unit 22 of the printer 10, the cartridge 36 delivered in accordance with the ordering processing is not in stock at user's hand. Accordingly, the stock flag is set to the out-of-stock state (M184).

The information management server 50 determines, for each ink color, whether the order condition is satisfied (M188) on the basis of the printer information periodically transmitted from the printer 10 (M186). When determining that there exists the cartridge 36 satisfying the order condition (M188), the information management server 50 determines whether the specific information of the ordered cartridge 36 in the management table 64 coincides with the latest specific information of the connected cartridge 36 (i.e. the specific information of the connected cartridge 36 received in M186). Incidentally, the determination is performed in the same ink color as the cartridge 36 that satisfies the order condition. That is, the determination is performed between the specific information of the connected cartridge 36 that satisfies the order condition and the specific information of the ordered cartridge 36 in the same ink color as the cartridge 36 that satisfies the order condition. In the management table 64, the specific information of the connected cartridge 36 "specific information #A" transmitted in M178 is stored as the specific information of the ordered cartridge 36. Since the cartridge 36 has not been exchanged during a time between the previous transmission of the printer information and the current transmission of the printer information, the specific information of the connected cartridge 36 received in M186 naturally coincides with that of the connected cartridge 36 transmitted in M178, i.e. the specific information of the ordered cartridge 36 "specific information #A" in the data storage area 62 (M190). As a result, it is estimated that the cartridge 36 whose ink amount has been reduced is the cartridge 36 delivered in accordance with the ordering processing. Thus, on the basis of the ink information, the information management server 50 determines that the order condition is satisfied. In response to the determination, the information management server 50 transmits the order instruction to the delivery management server 70 (M192).

The following describes a case where the order condition is satisfied and where the cartridge 36 connected to the printer 10 is not the cartridge 36 delivered in accordance with the ordering processing. As the example of the embodiment, FIG. 10 and the management table 64 illustrated in FIG. 8B is used. For example, there may be a case where the ink runs short before arrival of the cartridge 36 shipped in accordance with the ordering processing at user's hand, even when the delivery management server 70 has performed the ordering processing. In this case, the user often purchases at a retailer and connect the cartridge 36 to the connection unit 22 of the printer 10. That is, as illustrated in FIG. 10, it is assumed that the processing of M200 to M208 is executed like the processing of M160 to M168 in FIG. 9. In this case, when the cartridge 36 shipped in accordance with the processing of M208 has not arrived at user's hand, the delivery completion information is not transmitted from the delivery management server 70 to the information management server 50. Accordingly, in the information management server 50, the stock flag is not set to the in-stock state, but to the out-of-stock state.

When the ink runs short before the cartridge 36 shipped in accordance with the ordering processing of the delivery management server 70 has not been delivered at user's hand, the user removes the cartridge 36 connected to the connection unit 22 and connects the cartridge 36, which the user purchased at a retailer, to the connection unit 22 (M210). For convenience, the specific information of the cartridge 36 that the user has purchased is assumed to be "specific information #1". The information management server 50 analyzes the printer information (M212) periodically transmitted from the printer 10. As described above, when the cartridge 36 connected to the connection unit 22 has been exchanged in the printer 10, the information management server 50 determines that the specific information received this time does not coincide with the specific information received previous time. Specifically, the determination is made on the basis of the specific information of the connected cartridge 36 "specific information #1" in the printer information. Accordingly, the information management server 50 recognizes that the cartridge 36 has been exchanged in the printer 10 (M214), and then updates the specific information of the connected cartridge 36 of the management table 64, in which the specific information of the connected cartridge 36 is changed to "specific information #1" received in M212 (M213).

At this time, as described above, the information management server 50 has not received the delivery completion information, so that the stock flag is set to the out-of-stock state. That is, at timing when the cartridge 36 is exchanged in the printer 10, the cartridge 36 shipped in accordance with the ordering processing is not in stock at the user of the printer 10. Accordingly, it is estimated that the cartridge 36 newly connected to the connection unit 22 of the printer 10 following the cartridge exchange is not the cartridge 36 delivered in accordance with the ordering processing. Thus, the information management server 50 does not store the specific information received this time in the data storage area 62 as the specific information of the ordered cartridge 36 (M216). That is, a specific information different from the specific information transmitted in M212 is stored in the data storage area 62. In other words, the specific information of the cartridge 36 connected to the connection unit 22 in M210 is not stored as the specific information of the ordered cartridge 36. Accordingly, if the cartridge 36 has not been delivered to the user in accordance with the ordering processing, no specific information of the ordered cartridge 36 is stored in the management table 64.

The information management server 50 determines, for each ink color on the basis of the printer information (M218) periodically transmitted from the printer 10, whether the order condition is satisfied. When determining that there exists the cartridge 36 satisfying the order condition (M220), the information management server 50 determines whether the specific information of the ordered cartridge 36 in the data storage area 62 coincides with the latest specific information of the connected cartridge 36, i.e. specific information of the connected cartridge 36 received in M218. Incidentally, the determination is performed in the same ink color of the cartridge 36 satisfying the order condition. That is, the determination is performed between the specific information of the connected cartridge 36 that satisfies the order condition and the specific information of the ordered cartridge 36 in the same ink color as the cartridge 36 that satisfies the order condition. Here, the specific information of the ordered cartridge 36 is not stored in the management table 64. The cartridge 36 has not been exchanged from the previous transmission until the current transmission of the printer information, and the specific information of the connected cartridge 36 received in M218 therefore coincides with the "specific information #1" transmitted in M212. Accordingly, the specific information of the ordered cartridge 36 in the management table 64 is different from the specific information of the connected cartridge 36 received this time (M222). Thus, it is estimated that the cartridge 36 whose ink amount has been reduced is not the cartridge 36 delivered in accordance with the ordering processing. Thus, even when the information management server 50 determines that the order condition is satisfied on the basis of the ink information, the information management server 50 does not transmit the order instruction (M224).

As described above, when receiving the delivery completion information, the information management server 50 sets the stock flag to the in-stock state. If the stock flag is set to the in-stock state and the information management server 50 determines that the cartridge 36 has been exchanged in the printer 10, the specific information of the connected cartridge 36 received after the exchange of the cartridge 36 is stored in the management table 64 as the specific information of the ordered cartridge 36. When the specific information of the ordered cartridge 36 in the management table 64 coincides with the specific information of the connected cartridge 36 received from the printer 10, the information management server 50 determines that cartridge 36 delivered in accordance with the ordering processing is connected to the connection unit 22 of the printer 10. As a result, the information management server 50 can adequately determine whether the cartridge 36 connected to the connection unit 22 of the printer 10 is the cartridge 36 delivered in accordance with the ordering processing, without acquiring the specific information of the ordered cartridge 36 from the delivery management server 70. As a result, the same effects as those in the communication system 1 of the first embodiment can be obtained in the communication system 1 of the second embodiment.

As described above, when determining in M164 or M204 that the order condition is satisfied, the information management server 50 does not determine whether the cartridge 36 connected to the connection unit 22 of the printer 10 is the cartridge 36 delivered in accordance with the ordering processing. This is because the order of the cartridge 36 made in M166 or M206 is the first order of the cartridge 36 to be used in the printer 10, and normally the cartridge 36 is not in stock at the user of the printer 10. Thus, as in the communication system 1 of the first embodiment as well as the second embodiment, the cartridge 36 is ordered upon the first order of the cartridge when the order condition is satisfied. That is, this processing is irrespective of whether the cartridge 36 connected to the connection unit 22 is the cartridge 36 delivered in accordance with the ordering processing.

The processing in the information management server 50 of the second embodiment is performed upon execution of the control program 60 by the CPU 52 of the information management server 50. Hereinafter, a processing flow upon execution of the control program 60 will be described using FIGS. 11 and 12.

As illustrated in FIG. 11, when the control program 60 is executed by the CPU 52 of the information management server 50 according to the second embodiment, communication is established between the printer 10 and the information management server 50 (S200). Then, the information management server 50 waits for reception of information from the printer 10 or the delivery management server 70 (S202). Then, the CPU 52 determines whether the printer information has been received from the printer 10 (S204).

When determining that the printer information has not been received (NO in S204), the CPU 52 determines whether the delivery completion information has been received from the delivery management server 70 (S206). When the CPU 52 determines that the delivery completion information has been received (YES in S206), the stock flag is set to the in-stock state (S208). Then the processing flow returns to S202. Otherwise, when the CPU 52 determines that the delivery completion information has not been received (NO in S206), the processing of S208 is skipped, and the processing flow returns to S202.

When determining in S204 that the printer information has been received (YES in S204), the CPU 52 analyzes the received printer information (S210). Then, the CPU 52 determines, based on the specific information of the connected cartridge 36 included in the printer information, that the cartridge 36 connected to the connection unit 22 of the printer 10 has been exchanged (S212). When determining that the cartridge 36 has been exchanged (YES in S212), the CPU 52 determines whether the stock flag is set to the in-stock state (S214).

When the CPU 52 determines that the stock flag is not set to the in-stock state (NO in S214), the processing flow returns to S202. Otherwise, when the CPU 52 determines that the stock flag is set to the in-stock state (YES in S214), the specific information included in the printer information received in S204 is stored in the data storage area 62 as the specific information of the ordered cartridge 36 (S216). Then, the stock flag is changed to the out-of-stock state (S218). The processing flow then returns to S202.

When determining that the cartridge 36 has not been exchanged (NO in S212), the CPU 52 determines, based on the ink information included in the received printer information, whether the order condition is satisfied. That is, the CPU 52 determines whether the residual amount of ink in each color indicated by the ink information is equal to or less than a threshold amount (S220). When the CPU 52 determines that the residual amount of ink in each color indicated by the ink information is more than a threshold amount (NO in S220), the processing flow returns to S202. Otherwise, when the CPU 52 determines that the residual amount of ink indicated in the ink information is equal to or less than a threshold amount (i.e. when there exists the cartridge 36 whose residual amount of ink is not more than the threshold value) (YES in S202), the CPU 52 examines existence of the ordering history corresponding to the user of the printer 10 for the ink color of the cartridge 36 whose residual amount of ink is not more than the threshold value. That is, the CPU 52 determines whether it is the first ordering processing for the user of the printer 10 (S222).

When the CPU 52 determines that the ordering history for the user of the printer 10 exists (YES in S222), the CPU 52 determines whether the latest specific information received in S204 coincides with the specific information of the ordered cartridge 36 in the data storage area 62 (S224). When the CPU 52 determines that the latest specific information of the connected cartridge 36 and the specific information of the ordered cartridge 36 do not coincide with each other (NO in S224), the processing flow returns to S202. Otherwise, when the information management server 50 determines that the latest specific information of the connected cartridge 36 coincides with the specific information of the ordered cartridge 36 (YES in S224), the order instruction is transmitted to the delivery management server 70 (S226). Then, the processing flow returns to S202.

When the CPU 52 determines that the cartridge 36 ordering history for the user of the printer 10 is absent (NO in S222), S224 is skipped, and the order instruction is transmitted to the delivery management server 70 (S226). Then, the processing flow returns to S202.

While the description has been made in detail with reference to specific embodiments thereof, it would be apparent to those skilled in the art that various changes and modifications may be made therein without departing from the spirit and scope of the above described embodiments.

Specifically, in the above embodiments, the information management server 50 and the delivery management server 70 are provided as separated servers; however, they may be integrated into a single server. In this case, the integrated server issues an order of the cartridge 36 to a delivery agent and acquires the specific information of the ordered cartridge 36 and delivery completion information by itself.

In the above description, the printer 10 periodically transmits the ink information to the information management server 50; alternatively, the printer 10 may transmits the ink information at a predetermined timing. For example, the ink information may be transmitted to the information management server 50 at timing when the residual amount of ink of the cartridge 36 is reduced to a predetermined amount. Further, in the above description, the printer 10 detects the residual amount of ink by means of the detection sensor 26; alternatively, the printer 10 may detect the residual amount by a calculation. Specifically, the printer 10 calculates the ink amount consumed in the print processing on the basis of image data and print settings, and then subtracts the calculated amount of ink from the current residual amount of ink.

Further, in the above description, the recording unit 20 is an inkjet type; alternatively, the recording unit 20 may be an electrophotographic type. In this case, the cartridge 36 is filled with toner, in place of the ink.

Further, in the above description, the printer 10 is a color printer; alternatively, the printer 10 may be a monochrome printer. In this case, only a single cartridge 36 can be connected to the connecting unit 22.

Further, in the above description, the information management server 50 and the printer 10 directly exchange data such as the printer information; alternatively, they may indirectly exchange the data via a PC. Specifically, data exchange can be performed between the printer 10 connected to the PC by a USB cable, a LAN, or a wireless LAN and the information management server 50 via the PC.

Further, in the above description, the information management server 50 transmits, to the delivery management server 70, the printer ID together with the order instruction of the cartridge 36, and the delivery management server 70 specifies the user ID based on the printer ID; alternatively, the information management server 50 may transmit information different from the printer ID, and the delivery management server 70 may specify the user ID based on the information.

Further, in the above description, determination of whether the cartridge 36 has been exchanged is based on the specific information in the printer information. Alternatively, the determination may be based on the ink information in the printer information. Specifically, when the residual amount of ink indicated by the ink information received in N-th round is more than the residual amount of ink indicated by the ink information received in (N−1)th round, it can be determined that exchange of the cartridge 36 has been made.

Further, in the above description, the information management server 50 is constituted of a single web server; alternatively, it may be constituted of a plurality of web servers.

Further, in the above description, the CPU 52 or the like executes processing of FIGS. 6, 7, 11, and 12; alternatively, these processing may be executed by the CPU 52, an ASIC, or another logic integrated circuit or may be executed by cooperation of the CPU 52, ASIC, or another logic integrated circuit.

While the description has been made in detail with reference to specific embodiments thereof, it would be apparent to those skilled in the art that various changes and modifications may be made therein without departing from the spirit and scope of the above described embodiments.

What is claimed is:

1. A server device comprising:
   a communication interface configured to communicate at least with an external device;
   a memory; and
   a processor configured to perform:
   transmitting a first order instruction to the external device via the communication interface, the first order instruction being for ordering delivery of a first cartridge connectable to an image forming apparatus;
   after the first order instruction is transmitted, receiving, via the communication interface, delivered cartridge identification information for identifying the first cartridge that is delivered based on the first order instruction;
   storing the delivered cartridge identification information into the memory;
   receiving, via the communication interface, residual amount information and connected cartridge identification information from the image forming apparatus, the residual amount information about a residual amount of recording material remaining in a cartridge currently connected to the image forming apparatus, the connected cartridge identification information being for identifying the cartridge currently connected to the image forming apparatus;
   determining, based on the residual amount information, whether or not the residual amount of the recording material is equal to or less than a first threshold;
   determining, using the stored delivered cartridge identification information and the currently-received connected cartridge identification information, whether or not the stored delivered cartridge identification information corresponds to the currently-received connected cartridge identification information; and
   in response to determining that the residual amount of the recording material is equal to or less than the first threshold and the stored delivered cartridge identification information corresponds to the currently-received connected cartridge identification information, transmitting a second order instruction to the external device via the communication interface, the second order instruction being for ordering to deliver a second cartridge connectable to the image forming apparatus.

2. The server device according to claim 1, wherein the processor is configured to further perform:
    transmitting device identification information via the communication interface to the external device together with one of the first order instruction and the second order instruction, the device identification information being for identifying the image forming apparatus.

3. The server device according to claim 1, wherein the memory is configured to store the connected cartridge identification information, and
    wherein the processor is configured to further perform:
        determining whether or not the currently-received connected cartridge identification information is in coincidence with the previously-received connected cartridge identification information; and
        in a case where the currently-received connected cartridge identification is not in coincidence with the previously-received connected cartridge information, updating the previously-received connected cartridge identification information with the currently-received connected cartridge identification information in the memory, and
        wherein in a case where the currently-received connected cartridge identification information is in coincidence with the previously-received connected cartridge identification information, the processor determines whether or not the residual amount of the recording material is equal to or less than the first threshold.

4. The server device according to claim 1, wherein the processor is configured to further perform:
    determining whether or not the first cartridge has ever been delivered; and
    wherein, in response to determining that the residual amount of the recording material is equal to or less than the first threshold and the first cartridge has ever been delivered, the processor determines whether the stored delivered cartridge identification information corresponds to the currently-received connected cartridge identification information, and
    in the case where the stored delivered cartridge identification information corresponds to the currently-received connected cartridge identification information, the processor transmits the second order instruction to the external device via the communication interface, and
    wherein in a case where a cartridge has never been delivered and the first order instruction has not yet been transmitted to the external device, the processor is further configured to perform:
        receiving the residual amount information and the connected cartridge identification information from the image forming apparatus via the communication interface, and determining whether or not the residual amount of the recording material is equal to or less than the first threshold based on the residual amount information; and
        in response to determining that the residual amount of the recording material is equal to or less than the first threshold and a cartridge has never been delivered, the processor transmits the first order instruction to the external device via the communication interface.

5. The server device according to claim 1, wherein the external device is a server device other than the server device.

6. A non-transitory computer readable storage medium storing a set of program instructions installed on and executed by a server device, the server device comprising:
    a communication interface configured to communicate at least with an external device; and
    a memory,
    the program instructions comprising:
        transmitting a first order instruction to the external device via the communication interface, the first order instruction being for ordering to deliver a first cartridge connectable to an image forming apparatus;
        after the first order instruction is transmitted, receiving, via the communication interface, delivered cartridge identification information for identifying the first cartridge that is delivered based on the first order instruction;
        storing the delivered cartridge identification information into the memory;
        receiving, via the communication interface, residual amount information and connected cartridge identification information from the image forming apparatus, the residual amount information being about residual amount of recording material remaining in a cartridge currently connected to the image forming apparatus, the connected cartridge identification information being for identifying the cartridge currently connected to the image forming apparatus;
        determining, based on the residual amount information, whether or not the residual amount of the recording material is equal to or less than a first threshold;
        determining, using the stored delivered cartridge identification information and the currently-received connected cartridge identification information, whether or not the stored delivered cartridge identification information corresponds to the currently-received connected cartridge identification information; and
        in response to determining that the residual amount of the recording material is equal to or less than the first threshold and the stored delivered cartridge identification information corresponds to the currently-received connected cartridge identification information, transmitting a second order instruction to the external device via the communication interface, the second order instruction being for ordering to deliver a second cartridge connectable to the image forming apparatus.

7. A server device comprising:
    a communication interface configured to communicate at least with an external device;
    a memory; and
    a processor configured to perform:
        transmitting a first order instruction to the external device via the communication interface, the first order instruction being for ordering delivery of a first cartridge connectable to an image forming apparatus;
        after the first order instruction is transmitted, receiving, via the communication interface, cartridge delivery information indicating that the first cartridge has been delivered based on the first order instruction;
        receiving, via the communication interface, residual amount information and connected cartridge identification information from the image forming apparatus, the residual amount information being about a residual amount of recording material remaining in a cartridge currently connected to the image forming apparatus, the connected cartridge identification information being for identifying the cartridge currently connected to the image forming apparatus;

determining, based on the currently-received connected cartridge identification information, whether or not a cartridge connected to the image forming apparatus has been exchanged to the currently-connected cartridge;

in a case where it is determined that the cartridge connected to the image forming apparatus has been exchanged to the currently-connected cartridge and the cartridge delivery information was received before the currently-received connected cartridge identification information is received, storing the currently-received connected cartridge identification information as delivered cartridge identification information into the memory, the delivered cartridge identification information being for identifying the first cartridge that is delivered based on the first order instruction;

determining, based on the residual amount information, whether or not the residual amount of the recording material is equal to or less than a first threshold;

determining, using the stored delivered cartridge identification information and the currently-received connected cartridge identification information, whether or not the stored delivered cartridge identification information corresponds to the currently-received connected cartridge identification information; and in response to determining that the residual amount of the recording material is equal to or less than the first threshold and the stored delivered cartridge identification information corresponds to the currently-received connected cartridge identification information, transmitting a second order instruction to the external device via the communication interface, the second order instruction being for ordering to deliver a second cartridge connectable to the image forming apparatus.

8. The server device according to claim 7, wherein the memory is configured to further store:

the connected cartridge identification information received from the image forming apparatus, wherein the processor determines whether or not the cartridge connected to the image forming apparatus has been exchanged to the currently-connected cartridge, by determining whether or not the currently-received connected cartridge identification information is in coincidence with the previously-received connected cartridge identification information, and wherein the processor is configured to further perform:
in a case where the currently-received connected cartridge identification information is not in coincidence with the previously-received connected cartridge information, updating the previously-received connected cartridge identification information with the currently-received connected cartridge identification information in the memory, and wherein in a case where the currently-received connected cartridge identification information is in coincidence with the previously-received connected cartridge identification information, the processor determines whether or not the residual amount of the recording material is equal to or less than the first threshold.

9. The server device according to claim 8,
wherein the memory is configured to further store cartridge stock state information that is changeable between an in-stock state and an out-of-stock state, the in-stock state indicating that a delivered cartridge has not yet been connected to the image forming apparatus, the out-of-stock state indicting that a delivered cartridge has been connected to the image forming apparatus, wherein the processor is configured to further perform:
in a case where the processor receives the cartridge delivery information, changing the cartridge stock state information in the memory from the out-of-stock state into the in-stock state; and in a case where the currently-received connected cartridge identification information is not in coincidence with the previously-received connected cartridge identification information, determining whether or not the stock state information is in the in-stock state, thereby determining whether the cartridge delivery information was received before the currently-received connected cartridge identification information is received, wherein in a case where the stock state information is in the in-stock state, the processor stores the currently-received connected cartridge identification information as the delivered cartridge identification information into the memory, and returns the stock state information from the in-stock state into the out-of-stock state, and wherein in a case where the stock state information is in the out-of-stock state, the processor does not store the currently-received connected cartridge identification information as the delivered cartridge identification information into the memory.

10. The server device according to claim 7, wherein the external device is a server device other than the server device.

11. A non-transitory computer readable storage medium storing a set of program instructions installed on and executed by a server device, the server device comprising:

a communication interface configured to communicate at least with an external device; and a memory, the program instructions comprising:
transmitting a first order instruction to the external device via the communication interface, the first order instruction being for ordering delivery of a first cartridge connectable to an image forming apparatus;

after the first order instruction is transmitted, receiving, via the communication interface, cartridge delivery information indicating that the first cartridge has been delivered based on the first order instruction;

receiving, via the communication interface, residual amount information and connected cartridge identification information from the image forming apparatus, the residual amount information being about a residual amount of the recording material remaining in a cartridge currently connected to the image forming apparatus, the connected cartridge identification information being for identifying the cartridge currently connected to the image forming apparatus;

determining, based on the currently-received connected cartridge identification information, whether or not a cartridge connected to the image forming apparatus has been exchanged to the currently-connected cartridge;

in a case where it is determined that the cartridge connected to the image forming apparatus has been exchanged to the currently-connected cartridge and the cartridge delivery information was received before the currently-received connected cartridge identification information is received, storing the currently-received connected cartridge identification information as delivered cartridge identification information into the memory, the delivered cartridge identification information being for identifying the first cartridge that is delivered based on the first order instruction;

determining, based on the residual amount information, whether or not the residual amount of the recording material is equal to or less than a first threshold;

determining, using the stored delivered cartridge identification information and the currently-received connected cartridge identification information, whether or not the stored delivered cartridge identification information corresponds to the currently-received connected cartridge identification information; and in response to determining that the residual amount of the recording material is equal to or less than the first threshold and the stored delivered cartridge identification information corresponds to the currently-received connected cartridge identification information, transmitting a second order instruction to the external device via the communication interface, the second order instruction being for ordering to deliver a second cartridge connectable to the image forming apparatus.

* * * * *

UNITED STATES PATENT AND TRADEMARK OFFICE
CERTIFICATE OF CORRECTION

PATENT NO. : 10,336,086 B2
APPLICATION NO. : 15/085158
DATED : July 2, 2019
INVENTOR(S) : Makoto Matsuda Page 1 of 1

It is certified that error appears in the above-identified patent and that said Letters Patent is hereby corrected as shown below:

In the Claims

Column 22, Claim 9, Line 7:
Please delete "indicting" and insert --indicating--

Signed and Sealed this
Second Day of June, 2020

Andrei Iancu
*Director of the United States Patent and Trademark Office*